United States Patent [19]

Nubel et al.

[11] Patent Number: 5,403,904

[45] Date of Patent: Apr. 4, 1995

[54] PROCESS FOR PREPARATION OF TELECHELIC DIFUNCTIONAL UNSATURATED OLIGOMERS OR POLYMERS BY ACYCLIC OLEFIN METATHESIS

[75] Inventors: Philip O. Nubel; Robert B. Morland; Howard B. Yokelson, all of Naperville, Ill.

[73] Assignee: Amoco Corporation, Chicago, Ill.

[21] Appl. No.: 68,236

[22] Filed: May 27, 1993

[51] Int. Cl.$^6$ .................. C08F 4/69; C08F 4/68; C08F 236/20
[52] U.S. Cl. .................. 526/139; 526/136; 526/141; 526/142; 526/161; 526/166; 526/169; 526/169.1; 526/336; 585/507; 585/509; 585/506
[58] Field of Search .............. 526/136, 139, 141, 142, 526/161, 164, 166, 169, 169.1; 585/506, 507, 509

[56] References Cited

U.S. PATENT DOCUMENTS

| | | | |
|---|---|---|---|
| 3,597,403 | 8/1971 | Ofstead | 260/88.2 |
| 3,597,406 | 8/1971 | Calderon | 260/93.1 |
| 3,798,175 | 3/1974 | Streck et al. | 252/429 B |
| 3,857,825 | 12/1974 | Streck et al. | 260/88.1 |
| 3,935,179 | 1/1976 | Ofstead | 260/93.1 |
| 3,974,092 | 8/1976 | Streck et al. | 252/429 B |
| 3,974,094 | 8/1976 | Streck et al. | 252/429 B |
| 4,010,224 | 3/1977 | Scott et al. | 260/878 R |
| 4,020,254 | 4/1977 | Ofstead | 526/128 |
| 4,172,932 | 10/1979 | Ofstead et al. | 526/142 |
| 4,429,089 | 1/1984 | Pedretti et al. | 526/153 |
| 4,469,809 | 9/1984 | Klosiewicz | 502/117 |
| 4,520,181 | 5/1985 | Klosiewicz | 525/247 |
| 4,584,425 | 4/1986 | Tom | 585/827 |
| 4,699,963 | 10/1987 | Klosiewicz | 526/142 |
| 4,918,039 | 4/1990 | Martin | 502/113 |
| 4,977,226 | 12/1990 | Sugawara et al. | 526/112 |

OTHER PUBLICATIONS

Haekh's Chem. Dictionary, 4th ed., McGraw-Hill Co, Inc., N.Y., 16 (1969).
Schrock, et al., "Preparation and Reactivity of Several Alkylidene Complexes of the Type W(CHR') (N-2,-6-C$_6$H$_3$-i-Pr$_2$) (OR)$_2$ and Related Tungstacyclobutane Complexes. Controlling Metathesis Activity through The Choice of Alkoxide Ligand", *J. Am. Chem. Soc.*, pp. 1423-1435, (1988).
Wagener et al., Makromol. Chem. 191, pp. 365-374 (1990) Marmo and Wagener, "Acyclic Diene Metathesis (ADMET) Depolymerization. Synthesis of Mass-Exact Telechelic Polybutadiene Oligomers" *Macromolecules*, p. 2137 (1993).
Tag and Wagener, "Acyclic Diane Metathesis (ADMET) Polymerization. Synthesis of Telechelic Polyacetylene", *Polymer Preprints*, 34, 469-470 (1993).
K. J. Ivin, *Olefin Metathesis*, 1983, p. 149.
Kirk-Othmer, *Encyclopedia of Chemical Technology*, Third Edition, vol. 8, Diuretics to Emulsions, p. 597.
K. Ichikawa and K. Fukuzumi, *Metathesis of 1-Alkene*, 1976, pp. 2633-2635.

*Primary Examiner*—Fred Teskin
*Attorney, Agent, or Firm*—Mary Jo Kanady; Ronald S. Courtney; Wallace L. Oliver

[57] ABSTRACT

A process is disclosed for preparation of telechelic difunctional unsaturated oligomers and polymers having at least one internal carbon-to-carbon double bond wherein the functional groups are terminal reactive groups. The reactants are acyclic polyenes with terminal carbon-to-carbon double bonds and olefins with at least one functional group. The polymerization process is substantially free of side reactions comprising double bond migration and cyclization. The telechelic difunctional unsaturated oligomers and polymers have a functionality of about 2 and are suitable for preparation of block copolymers, ion exchange resins, adhesives, and flocculants and for further functionalization.

15 Claims, No Drawings

# PROCESS FOR PREPARATION OF TELECHELIC DIFUNCTIONAL UNSATURATED OLIGOMERS OR POLYMERS BY ACYCLIC OLEFIN METATHESIS

BACKGROUND OF THE INVENTION

This invention relates to a process for preparation of telechelic difunctional unsaturated oligomers and polymers having at least one internal carbon-to-carbon double bond by olefin cross-metathesis of acyclic polyenes in the presence of a functionalized olefin containing at least one reactive component selected from the group consisting of a nitrile, ester, alcohol, diol, amine, acid, acyl halide, ketone, aidehyde, borane, amide, acid anhydride, ether, imide, halogen atom, alkyne, alkyl, aryl, and a substituted aryl group, employing a catalyst composition comprising (A) a transition metal chloride, oxyhalide, oxide or ammonium salt, (B) an organic tin compound or aluminum halide reagent and (C) an organic Lewis base wherein undesired side reactions such as double bond migration are minimized and the functionality of the product is about 2. With acyclic polyenes and functionalized olefin reactants, the process yields telechelic difunctional unsaturated oligomers and polymers having at least one internal carbon-to-carbon double bond such as alpha, omega difunctional polybutadienes with acetoxy (OAc) endgroups from the reaction of 1,5-hexadiene and 4-pentenyl acetate. These telechelic difunctional unsaturated oligomers and polymers with terminal endgroups are suitable for further functionalization or incorporation into other polymers for preparation of block copolymers, ion exchange resins, adhesives and flocculants.

Acyclic unsaturated compounds containing functional groups have been prepared by the olefin metathesis reaction. The metathesis of unsaturated ethers, amines and chlorides has been reported (K. J. Ivin, *Olefin Metathesis*, Academic Press, London, N.Y., 149, 1983) as the result of no inherent conflict between the functional groups and the metal carbene bond. However, it is reported that the interaction of the catalyst complex with functional groups of the subject olefin can be critical.

As is well known, side reactions can occur during olefin metathesis reactions. These side reactions include alkylation, isomerization, cyclization and addition across double bonds present in the molecular structure. Surprisingly, it has been found that in a cross-metathesis reaction between a polyene and a olefin under the conditions of the present invention, these side reactions are minimal. Functionality of oligomers and polymers prepared by the process of this invention is about 2.

This invention relates to preparation of acyclic telechelic difunctional unsaturated oligomers and polymers having at least one internal carbon-to-carbon double bond by means of an olefin cross-metathesis reaction in the presence of a catalyst system for such reaction and in the presence of a functionalized olefin. In one aspect, this invention relates to the conversion of acyclic polyenes to acyclic telechelic difunctional unsaturated olefinic compounds by disproportionation or cross-metathesis of two olefins and to the oligomers and polymers derived therefrom having a functionality of about 2. In another aspect, it relates to the olefin cross-metathesis reaction of acyclic polyenes in the presence of a functionalized olefin containing at least one functional group wherein undesired side reactions, or little or no double bond migration or cyclization, occur. Depending upon the nature of the functional terminal end-group of the acyclic difunctionalized unsaturated oligomer and polymer, the products of the olefin metathesis reaction are useful in the preparation of other compounds such as segmented copolymers.

The disproportionation or metathesis of olefins is a reaction in which one or more olefinic compounds are transformed into other olefinic compounds of different molecular weights. The disproportionation of an olefin to produce an olefin of higher molecular weight and an olefin of lower molecular weight can be a self-disproportionation reaction as propylene to ethylene and butene, or co-disproportionation of two different olefins to produce still other olefins, also termed cross-metathesis of olefins.

The utility of the olefin disproportion reaction, commonly termed an olefin metathesis reaction, has been recognized as a means to obtain olefinic compounds bearing functional reactive groups such as esters, ethers, halogens and others. However, inasmuch as the olefin metathesis reaction is an equilibrium reaction of unsaturated compounds, the usual consequences of an equilibrium reaction can be present, i.e., yields of the desired product can be low unless a suitable means of driving the reaction to completion can be utilized. Also, the catalyst present to initiate olefinic metathesis can initiate by-product reactions. The reverse of the olefinic metathesis reaction can occur wherein the reaction products self-metathesize to form other olefinic compounds. Terminal olefins have been found to self-metathesize rapidly such as in the industrial process for conversion of propylene to other products. The cis-trans configuration of the final product may be predominantly trans, or predominantly cis, or a mixture of cis-trans, depending upon reaction conditions, including the catalyst utilized.

The disproportionation of olefins bearing functional groups is an especially economically useful reaction in that the products bearing functional groups have been available and valuable for use in polymer formation and chemical transformations to yield industrially valuable products. Examples of functional reactive groups previously available are esters, hydroxides, amines, halides. However, difunctional hydrocarbon oligomers and polymers having at least one internal carbon-to-carbon double bond wherein the functional groups are terminal reactive groups have not been previously prepared from acyclic polyenes by metathesis reaction except by a difficult and not easily-available catalytic process.

Telechelic polymers having functional groups usable for further reactions, i.e., cross-linking reactions or the construction of other defined polymer structures such as block copolymers, etc., are of great interest from the viewpoint of possible applications. A polymer halogen-terminated at both ends can be reacted with a metal-terminated chain of another polymer to produce block copolymers. Hydroxy-terminated polymer chains can be reacted with di- and/or tri- polyisocyanates and/or analogous polyfunctional compounds such as acid chlorides of polybasic acids.

Telechelic difunctional polymers have been prepared in the past by termination of living polymers with anionic, cationic and metathesis polymerizations of cyclic olefins. Metathesis polymerizations of cyclic olefins can restrict the availability of products available to those which can be prepared from a relatively few cyclic olefins, typically of from about 5 to about 9 carbon atoms. Difunctional polymers derived from cyclic olefins can be limited in functional groups to those of the precursor cyclic olefins. With acyclic olefins, the olefin metathesis reaction with cleavage and reforming of carbon-to-carbon double bonds, the redistribution of alkylidene moieties leads to a random product distribution at equilibrium (Kirk-Othmer, *Ency. Chem. Tech.*, 597, 3rd ed., Vol. 8). Telechelic difunctional hydrocarbon oligomers/polymers produced via anionic or free-radical polymerizations of acyclic olefins typically are mixtures of polymer structures. For example, alpha-omega difunctional polybutadienes prepared by anionic or free-radical polymerization of butadiene contain mixtures of 1,4-and 1,2-polybutadiene structures, have molecular weights of 1000–4000 and are terminated with hydroxy or carboxy functionalities. Typically, the functionalities are less than difunctional, the functionality number being less than 2; or greater than difunctional, the functionality number being greater than 2, the products being mixtures of functional endgroups, e.g., mono-functional, difunctional, and non-functional.

DESCRIPTION OF THE PRIOR ART

Previous procedures to prepare polymeric hydrocarbons having reactive functional end groups frequently have utilized cyclic olefinic compounds in conjunction with a ring opening step. Ofstead, U.S. Pat. No. 3,597,403, teaches a process for ring-opening polymerization of unsaturated alicyclic compounds, preferably unsaturated alicyclic compounds of a single unsaturated alicyclic ring containing at least four carbon atoms and not more than five carbon atoms wherein the carbon-to-carbon double bonds in the ring are not adjacent and are non-conjugated in the presence of a catalyst system comprising an alkylaluminum halide, molecular oxygen, and a compound of tungsten or molybdenum. Streck, et al., U.S. Pat. No. 3,798,175 teaches a process for ring opening polymerization of cyclic olefins and forming terminal carbalkoxy groups by employing a catalyst system consisting essentially of (1) a tungsten or molybdenum compound, (2) an organo aluminum compound, (3) an unsaturated carboxylic acid ester. Streck, et al., U.S. Pat. No. 3,857,825, discloses a process for production of polymeric hydrocarbons having reactive silyl end groups by a ring-opening polymerization of a cyclic olefin in the presence of a catalytic amount of a halogenated compound of a metal selected from the group consisting of niobium, tantalum, molybdenum, tungsten and rhenium and a halogen, alkoxy, carboxylate or Lewis acid.

Accordingly, although the prior art teaches the preparation of polymeric hydrocarbons having functional end groups such as esters, amines, hydroxies and other reactive groups, investigators have continued to search for an acyclic diolefin metathesis process and catalyst for preparation of difunctional oligomers and polymers wherein the functional groups are reactive groups such as cyano groups, ester groups, acid anhydride groups, ether groups, imide groups, halogen atoms and aromatic groups as well as other groups.

Wagener, et al. *Makromol. Chem.* 191,365–374 (1990) reported a successful acylic diene metathesis polymerization wherein vinyl terminated oligo(octenylene)s were synthesized using a Lewis acid free catalyst, W(CH-t-Bu) (N-2,6-C$_6$H$_3$-i-Pr$_2$)(OCMe(CF$_3$)$_2$)$_2$, the catalyst taught by Schrock, et al., *J. Am. Chem. Soc.* 110, 1423 (1988). Ratio of reactant to catalyst was in a mole ration of 500:1. Yields were reported as essentially quantitative.

Preparation of difunctional terminated unsaturated polymers by olefin metathesis from a polyene and a olefin containing a functional group has been reported by Wagener, et al., *Macromolecules* 26, 2137-2138 (1993); Wagener, et al, *Polymer Preprints*, 34, 469–470 (1993), using the catalyst taught by Schrock, et al. *J. Am. Chem. Soc.,* 110, 1423 (1988) as noted above.

However, the catalyst composition reported as used by Wagener has not been disclosed as commercially available and is difficult and expensive to prepare.

Olefin metathesis Lewis acid catalyst systems have been extensively reported in the prior art. Calderon, et al., U.S. Pat. No. 3,597,406, teach the polymerization of hydrocarbon substituted cyclic compounds by a ring-opening polymerization of hydrocarbon substituted cyclooctadienes in the presence of a Lewis acid catalyst system comprising (A) at least one organometallic compound wherein the metal is selected from the group consisting of Ia, IIa, IIb, and IIIa of the Periodic Table of Elements, (B) at least one transition metal salt selected from the group consisting of tungsten and molybdenum halides, and (C) at least one compound of the general formula R—Y—H wherein Y is oxygen, H is hydrogen and R is a radical selected from the group consisting of (1) hydrogen (2) alkyl, (3) aryl, (4) arylalkyl, (5) alkaryl, (6) alkenyl and radicals thereof. Ofstead, U.S. Pat. No. 3,935,179, teaches a Lewis acid catalyst comprising (A) tungsten or molybdenum halides, (B) alkyl aluminum halides, and (C) an alcohol which may optionally contain a halogen constituent, and (D) an alcohol which has a nitrile substituent for ring opening polymerization of cycloolefins by cleavage of the carbon-to-carbon double bonds. Ring-opening polymerizations of cyclic olefins in presence of a Lewis acid catalyst are also taught in U.S. Pat. Nos. 3,974,092; 3,974,094; 4,010,224; 4,020,254; and 4,172,932.

Olefin metathesis Lewis acid catalyst systems for polymerizing and copolymerizing diolefins have been taught in the prior art wherein the catalyst system is comprised of a Lewis acid and a particular compound which permits carrying out the polymerization and copolymerization reactions starting with diolefins to give products of desired properties. For example, U.S. Pat. No. 4,429,089 teaches a catalytic system for polymerizing and copolymerizing diolefins comprising a Lewis acid, an aluminum compound and a particular compound belonging to the lanthanide series to give products having a high content of 1,4-cis units and high molecular weights from aliphatic conjugated diolefins such as 1,3-butadiene, 1,3-pentadiene, isoprene and their mixtures. U.S. Pat. No. 4,469,809 teaches a two-part-metathesis catalyst system wherein the first part of the catalyst system is comprised of a metathesis catalyst, preferably, WOCI$_4$, WCI$_6$, and a Lewis base to moderate the polymerization rate of a tungsten/monomer solution, the monomer preferably dicyclopentadiene. The second part of the catalyst system comprises an activator such as tetrabutyltin, triethylaluminum and similar compounds. The activator solution includes an ester, ether, ketone or nitrile which serves to moderate the rate of polymerization. Similar catalyst systems are taught in U.S. Pat. Nos. 4,520,181; 4,699,963; and 4,918,039 wherein a Lewis base was used to moderate the polymerization reaction of a Lewis acid. U.S. Pat. No. 4,918,039 teaches that in the presence of a transition metal halide and a catalyst activator comprising an alkyl tin reagent, the presence of a Lewis base to stabilize the polymerization reaction can be omitted since an alkyl tin activator is a poorer Lewis acid. U.S. Pat. No. 4,977,226 teaches a ring-opening process for polymerizing a norbornene monomer in the presence of a metathesis catalyst system comprising a tungsten compound such as tungsten hexachloride in the presence of a Lewis base to prevent premature polymerization.

With the exception of the teachings of Wagener, Makrotool. Chem. 191, 365–374 (1990); Macromolecules, 26, 2137–2138 (1993); Polymer Preprints, 34,469–470 (1993), prior investigators have not dealt with the problem of preparing difunctional oligomers and/or polymers wherein the functional groups are terminal reactive groups from acyclic polyene reactants. As detailed above, Lewis acid catalysts are taught in the preparation of olefinic compounds via a ring opening reaction. The effect of the presence of Lewis base upon the rate of polymerization by a Lewis acid of an olefinic compound has been recognized but there has been no teaching or inference that a metathesis catalyst system comprising a Lewis acid, an activator and a Lewis base can be used to prepare difunctional terminal reactive groups oligomer and/or polymers from acyclic terminal polyene reactants.

K. Ichikawa, et al., *J. Org. Chem.*, 41,2633–2635 (1976) taught use of a Lewis base catalyst as being effective for reactions of 1-alkenes using a $WCl_6/Bu_4Sn$ catalyst with addition of esters, acetonitrile, phenylacetylene, dicyclopentadiene and ethers to improve the selectivity to the metathesis reaction by depressing side reactions. The reactants were 1-pentene, 1-hexene, 1-heptene, 1-octene and 1-decene. The optimum range of the Sn/W mole ratio was from 2:1 to 8:1. The ratio of 1-octene to $WCl_6$ was 20–400. Products were ethylene and a symmetric internal alkene.

It is accordingly surprising and unexpected that telechelic difunctional oligomers and/or polymers having at least one internal carbon-to-carbon double bond wherein the functional groups are terminal reactive groups and the functionality is about 2 can be prepared from acyclic polyene reactants and olefins containing at least one functional group in the presence of a catalyst component comprising a transition metal chloride, oxychloride, oxide, or ammonium salt, an activator comprising an organic tin compound or an aluminum halide compound and an organic Lewis base selected from the group consisting of an ester, nitrile, ether, amine, alcohol, amide, alkyne, and organic phosphorus compounds.

It is therefore an object of this invention to provide a metathesis catalytic process for metathesizing acyclic polyenes to unsaturated oligomers and/or polymers, which does not cause the vinyl addition reaction by causing the formation of carbocations, and, with acyclic polyene reactants and a olefin containing at least one functional group yields unsaturated difunctional oligomers and/or polymers wherein the functional groups are terminal reactive groups and the functionality is about 2. It is further an object of this invention to provide a catalytic process for the preparation of difunctional unsaturated oligomers and/or polymers wherein the functional groups are terminal functional groups. It is further an object of this invention to provide difunctional unsaturated oligomers and/or polymers wherein the functional groups are reactive terminal groups and thus are positioned for further functionalization and/or incorporation into other reactive compounds. The reactive terminal groups can be reacted to prepare block copolymers, ion exchange resins, adhesives and flocculants.

SUMMARY OF THE INVENTION

This invention relates to a polymerization process for preparation of telechelic difunctional unsaturated oligomers and/or polymers wherein the functional groups are reactive terminal groups and the functionality of the oligomers and polymers is about 2. The reactants are acyclic polyenes with terminal double bonds and olefins with at least one functional group. The polymerization process is substantially free of side reactions comprising double bond migration and cyclization. The catalyst system comprises a composition of a transition metal chloride, oxychloride, oxide, or ammonium salt, an organic tin compound or an aluminum halide, and an organic Lewis base. The difunctional telechelic unsaturated functional oligomers and/or polymers wherein the functional groups are terminal reactive groups can be further reacted to prepare block copolymers, ion exchange resins, adhesives and flocculants.

DETAILED DESCRIPTION OF THE INVENTION

The present invention relates to a polymerization process for preparation of telechelic difunctional unsaturated oligomers and/or polymers having a functionality of about 2 from acyclic polyene reactants and olefins containing at least one functional group in the presence of a metathesis catalyst comprising (A) a transition metal compound, (B) an activator comprising an organic tin compound or an aluminum halide, and (C) an organic Lewis base. The ratios of the three components are in the range of from 1.0:0.1:0.1 to 1.0:200:200, preferably 1.0:2.0:2.0. The olefin containing a functional group is also a chain terminating agent. Product molecular weight is controlled by the molar ratio of the acyclic polyene reactant and the functional olefin reactant. The molar ratios of the two reactants are in the range of from about 1:1 to 10,000:1, polyene to functional olefin. A low molar ratio yields lower molecular weight products, while a higher ratio yields higher molecular weight products. The telechelic difunctional unsaturated oligomers and polymers having at least one internal carbon-to-carbon double bond wherein the functional groups are reactive terminal groups are suitable for use as reactants to yield higher molecular weight compounds or can be further reacted to form other chemical intermediates.

As the metathesis catalyst component (A), there can be mentioned halides, oxyhalides, oxides and organic ammonium salts of tungsten, molybdenum, rhenium and tantalum. As preferred examples, there can be mentioned tungsten compounds such as tungsten hexachloride, tungsten oxytetrachloride, tungsten oxide, tridodecylammonium tungstate, methyltricaprylammonium tungstate, tri(tridecyl)ammonium tungstate and trioctylammonium tungstate, molybdenum compounds such as molybdenum pentachloride, molybdenum oxytrichloride, tridecylammonium molybdate, methyltricaprylammonium molybdate, tri(tridecyl)ammonium molybdate and trioctylammonium molydate, rhenium compounds such as rhenium pentachloride, and tantalum compounds such as tantalum pentachloride. Use of a catalyst soluble in the monomer used for the reaction is preferred. Where the catalyst is a halide, the catalyst can be solubilized by treating the catalyst with an alcohol or phenol compound in advance.

Organic tin compounds, alkylaluminum halides, alkoxyalkylaluminum halides and aryloxy-alkylaluminum halides can be used as the activator (co-catalyst) (B). As preferred examples, there can be mentioned tetrabutyltin, tetramethyltin, tetraethyltin, tetraphenyltin, ethylaluminum dichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichloride, methylaluminum sesquibromide, and precondensates of alkylaluminum halides with alcohols.

The Lewis base (C) useful in this invention includes, for example, esters, e.g., alkyl acetates of from 3 to 30 carbon atoms, nitriles of from 2 to 30 carbon atoms, e.g., acetonitrile, and acetylacetone, tetrahydrofuran, pyridine, N,N'-dimethylformamide, thiophene, ethyl ether, propyl ethers, diphenyl ether, triethylamine, phenylacetylene, organic phosphorus compounds, monohydric and dihydric alcohols having 1 to 30 carbon atoms such as methyl alcohol, ethyl alcohol, n-propyl alcohol, isopropyl alcohol, n-butyl alcohol, isobutyl alcohol, tert-butyl alcohol, n-pentyl alcohol, isopentyl alcohol, 2-methyl-1-butyl alcohol, 2-methyl-2-butyl alcohol, n-hexyl alcohol, n-heptyl alcohol, n-octyl alcohol, isooctyl alcohol, 2-ethylhexyl alcohol, n-nonyl alcohol, n-decyl alcohol, 1,5-pentanediol, 1,6-hexanediol, allyl alcohol, crotyl alcohol, 3-hexene-1-ol, citronellol, cyclopenatnol, cyclohexanol, salicyl alcohol, benzyl alcohol, phenethyl alcohol, cinnamyl alcohol, and the like. Olefinic unsaturates of the above-named Lewis base compounds can suitably serve as the functional olefin reactant. The Lewis base (C) is preferably an ester, such as an alkyl acetate, instead of an alcohol. A nitrile such as acetonitrile is preferable to pyridine.

In the process of preparing the catalyst, the constituent (A) of the catalyst complex preferably is dissolved first in a hydrocarbon solvent, followed by dissolving constituent (C) in the solvent. Constituent B, the activator, is added to the solvent last. The then obtained catalyst is used to prepare the unsaturated oligomers and/or polymers.

In general, any acyclic diene or polyene, aliphatic or aromatic, of from 2 to about 30 carbon atoms, can be oligomerized or polymerized, in the presence of a functionalized olefin in the process of this invention. Examples include 1,5-hexadiene, 1,9-decadiene, 1,3-butadiene, 1,5,9-decatriene, divinylbenzene and mixtures thereof.

The functionalized olefin contains at least one or more reactive component selected from the group consisting of a nitrile, ester, alcohol, diol, amine, acid, acyl halide, ketone, aidehyde, borane, acid anhydride, ether, imide, halogen atom, alkyne, alkyl, aryl, and substituted aryl groups of up to 30 carbon atoms. Typically, the preferred functional olefins contain no more than about 30 carbon atoms per molecule. Suitable functional olefins for use in the process of the instant invention include 4-penten-1-yl acetate, methyl or ethyl vinylacetate, isobutyl vinylacetate, cyclohexyl vinylacetate, phenyl vinylacetate, methyl or ethyl 4-pentenoate, amyl 4-pentenoate, benzyl 4-pentenoate, propyl 3-decenoate, methyl 10-undecenoate, ethyl 10-undecenoate, methyl oleate, ethyl oleate, butyl oleate, methyl isooleate, ethyl 6-octadecenoate, butyl 6-ocatdecenoate, ethyl elaidate, butyl elaidate, methyl brassidate, methyl linolate, diethyl 2-allylmalonate, allyl acetate, oleyl acetate, 3-hexenyl acetate, oleyl oleate, 2-hexenyl 2-methylpropionate, 3-hexenyl valerate, 2-hexenyl acetate, allyl propionate, oleyl benzoate, 9-octadecenenitrile, 6-octadecenenitrile, 3-butenenitrile, 1,4-dicyano-2-butene, 4-pentenenitrile, octadecenedinitrile, 9,12-octadecadienenitrile, 9-decenenitrile, 10-undecenenitrile, 9-octadecenyl ethyl ether, 9-octadecenyl isopropropyl ether, crotyl isoproply ether, trimethylallyloxysilane, allylanisole, allyl phenyl ether, 8-heptadecenyl ethyl ketone, 5-heptadecnyl ethyl ketone, 5-hexen-2-one, 6-methyl-5-hepten-2-one, N,N-diethyloleamide N,N-diethylvinylacetamide, alkyl acrylates, alkyl methacrylates, alkyl undecylenates, 3-buten-1-yl acetate, and vinyl acetate.

The metathesis catalyst comprising (A), the transition metal compound, is used in an amount of about 0.01 to about 50 millimoles, preferably 0.1 to 10 millimoles, per mole of the acyclic diene or polyene. The activator (co-catalyst) (B) is used at a molar ratio of from 0.1 to 200, preferably from 1 to 10, per mole of the catalyst component (A).

Preferably both the metathesis catalyst and the activator are used when dissolved in the monomer, but the catalyst and activator can be used when suspended or dissolved in a small amount of a solvent, as long as the properties of the product are not substantially degraded.

In producing the lower-molecular weight oligomers, it is sufficient if the above-mentioned acyclic polyene monomer and the olefin and the metathesis catalyst system are used, and the final product is obtained by adding a polymerization stopper when the viscosity of the product reaches a predetermined level after initiation of the polymerization.

Any reagent for deactivating the activator or the metathesis catalyst system, for example, an alkylaluminum chloride, or the catalyst component of the metathesis catalyst system, for example, a tungsten compound catalyst or a molybdenum compound catalyst, can be used as the stopper for the polymerization reaction. As preferred examples, there can be mentioned alcohols such as methanol, ethanol, n-propyl alcohol and n-butanol, amines such as ammonia, organic acids such as acetic acid and propionic acid, oxygen, and carbon dioxide.

If an appropriate amount of an alcohol is used as the stopper for the reaction, only the activator such as an aluminum compound is deactivated but the catalyst component such as a molybdenum catalyst is left in the liquid product while retaining the activity. Of course, a stopper capable of deactivating both of the activator and the catalyst component can be used. In the polymization reaction, the metathesis catalyst component is used in an amount of 0.01 to 50 millimoles, preferably 0.1 to 10 millimoles, per mole of the monomers as a whole. The activator (cocatalyst) is used at a molar ratio of from 0.1 to 200, preferably from 1 to 10, to the catalyst component. It is sufficient if the stopper for the polymization reaction is used in an amount enough to deactivate the catalyst System. The amount differs according to the kind of the activator or the catalyst component, but the amount can be easily determined by preliminary experiments. For example, where a dialkylaluminum halide is used as the activator and an alcohol is used as the stopper for the viscosity-increasing reaction, it is sufficient if the alcohol is used in an amount of at least 2 moles per mole of the activator.

In the event one part of the catalyst system comprises the tungsten containing catalyst, the tungsten compound is preferably first suspended in an amount of a suitable solvent. The solvent must not be susceptible to halogenation by the tungsten compound. Examples of preferred solvents are benzene, toluene, xylene, cyclohexane, chlorobenzene, dichlorobenzene trichlorobenzene, and mixtures thereof.

The metathesis oligomerization/polymerization is preferably performed in liquid phase, with catalyst components dissolved in a solvent or liquid diene (polyene) reactant. Reaction temperatures are preferably from about 0° C. to 200° C. Pressure can be in the range of from about $1 \times 10^{-6}$ mm Hg to about 30 atmospheres, preferably from about $1 \times 10^{-6}$ mm Hg to about 1 atmosphere. The light olefin coproduct (ethylene in the case of polyene reactants with terminal carbon-to-carbon double bonds) should be removed efficiently to drive the reaction to high conversion.

In the practice of this invention, the catalyst system preferably comprises a tungsten metal chloride, a tetraalkyltin reagent and an organic Lewis base selected from the group consisting of an alkyl acetate, a nitrile, an ether, an amine and an alcohol. Inasmuch as the tungsten catalyst in the presence of an activator such as a tetraalkyltin compound, in the absence of a Lewis base, can catalyze side reactions in a metathesis reaction of an olefin compound, a sequence of mixing the components of the catalyst system is preferred.

The tungsten compound is preferably suspended in a small amount of a suitable solvent, preferably with the monomer if the tungsten compound is soluble in the monomer. An alcoholic or phenolic compound is also suitable, phenolic compounds being preferred over an alcoholic compound. Suitable phenolic compounds include phenol, alkyl phenols, and halogenated phenols, with tert-butyl phenol, tert-octyl phenol and nonyl phenol most preferred. The preferred molar ratio of the tungsten compound/phenolic compound is from about 1:1 to about 1:3. The tungsten compound/phenolic compound solution can be prepared by adding the phenolic compound to the tungsten compound, stirring the solution and then blowing a stream of a dry inert gas through the solution to remove any hydrogen chloride.

The addition of the Lewis base or a chelating agent can be in an amount of from about 0.1 to about 200 moles of Lewis base or chelating agent per mole of tungsten compound, preferably about 1.0:2.00. Preferred chelants include acetylacetone and alkyl acetoacetates where the alkyl group contains from 1 to 10 carbon atoms. Preferred Lewis bases include nitriles, ethers and esters such as alkyl acetates, benzonitrile, acetonitrile, tetrahydrofuran.

In the co-metathesis reaction, one of the products of the metathesis reaction is an olefin of a lower molecular weight than the starting monomer. It has been found that removal of the olefin of the lower molecular weight is essential to obtain high reaction conversion and functionality about 2. This may be accomplished by suitable means such as purging the reaction vessel with inert gas, by applying a low or high vacuum to the system, or by any combination of these methods during the reaction, including the omission of one or more of these procedures, the said steps being in any sequence and capable of being omitted individually. The inert gas can comprise nitrogen, the low vacuum from about 1 mm Hg to about 400 mm Hg, and the high vacuum to about $1 \times 10^{-6}$ Hg.

Accordingly, the instant invention comprises a polymerization process for preparation of telechelic difunctional unsaturated oligomers and polymers having at least one internal carbon-to-carbon double bond, containing functional groups which predominantly comprise terminal functional reactive groups, said oligomers and polymers having a functionality of about 2, wherein said polymerization process is substantially free of side reactions comprising double bond migration and cyclization, from acyclic polyenes of from 3 to about 30 carbon atoms, and olefins of up to about 30 carbon atoms containing at least one functional group wherein said functional group is selected from the group consisting of a nitrile, ester, alcohol, diol, amine, acid, acyl halide, ketone, aidehyde, borane, amide, acid anhydride, ether, imide, halogen atom, alkyne, alkyl, aryl, and substituted aryl groups of up to 30 carbon atoms wherein said acyclic diene and said olefin are reacted in a cross-metathesis reaction in the presence of a catalyst system comprising a metathesis catalyst (A) comprising a transition metal compound selected from the group consisting of halides, oxyhalides, oxides and organic ammonium salts of tungsten, molybdenum, rhenium and tantalum; an activator and co-catalyst (B) selected from the group consisting of organic tin compounds, alkylaluminum halides, alkoxyalkylaluminum halides and aryloxy-alkylaluminum halides; and an organic Lewis base (C) selected from the group consisting of alkyl acetates of from 3 to 30 carbon atoms, acetonitrile, acetylacetone, tetrahydrofuran, pyridine, N,N'-dimethylformamide, thiophene, diphenylether, triethylamine, organic phosphorus compounds, monohydric and dihydric alcohols of from 1 to 30 carbon atoms, wherein said metathesis catalyst (A) is present in an amount of from about 0.01 to about 50 millimoles per mole of said acyclic polyene, activator (B) is present in a molar ratio to metathesis catalyst (A) of from about 0.1:1 to about 200:1, and Lewis base (C) is present in a molar ratio to metathesis catalyst (A) of from about 0.1:1 to about 200:1.

The following examples are exemplary only and are not to be construed as limiting the scope of this invention.

EXAMPLE

Chlorobenzene solvent (Aldrich Chemical Co., Milwaukee, Wis. HPLC grade) was purified by passage through a column of silica gel and 13X sieves, and stored over 4A sieves. Propyl acetate and tetramethyltin were dried over 4A sieves. 1,5-Hexadiene (98%, Aldrich) was purified by distillation, passage through a column of silica/13X sieves, and storage over 4A sieves. 4-Penten-1-yl acetate (Aldrich, 98%) was stored over 4A sieves.

A 250-mL three-neck round-bottom glass flask (with magnetic stirbar) was fitted with a water-cooled reflux condenser (on one neck) and stopcock adapters (on the other necks). The apparatus was dried and filled with a nitrogen atmosphere, and an oil bubbler was connected to the top of the reflux condenser to allow escape of gas products.

A catalyst solution was prepared by dissolving, in order, 0.80 g tungsten hexachloride (2 mmol), 0.92 mL propyl acetate (8 mmol), and 0.56 mL tetramethyltin (4mmol) in 25 mL chlorobenzene under nitrogen. The solution was charged into the above-described glass apparatus by cannulation under nitrogen. 1,5-Hexadiene (23.7 mL, 200 mmol) and 4-penten-1-yl acetate (1.41 mL, 10 mmol) were added via syringe. The solution was then heated to 65° C. by a thermostated oil bath, at which point boiling and reflux began and evolution of gas was observed. Over the course of about 30 minutes the temperature was raised to 75° C. The solution was stirred at 75° C. for 2.5 hours, then the temperature was raised to 80° C. and maintained at this temperature for the duration of the experiment. After raising the temperature to 80° C., evolution of gas continued but slowed greatly within 1–2 hours. GC (FID) analyses of evolved gases indicated ethylene to be the primary (and essentially only) gaseous product. Within 1–2 hours at 80° C., the rate of ethylene evolution had dropped to roughly less than 10% of the rates observed earlier in the experiment (at 65°–75° C). After 3 hours at 80° C., a rapid sweep of nitrogen (500–1000 mL/min) was begun through the apparatus, entering through one neck of the flask and exiting through the reflux condenser. The solution was maintained at 80° C. under this nitrogen sweep overnight (15 hours) with the condenser water on. At the end of this time, a viscous brown residue remained in the reaction flask and most of the chlorobenzene solvent had evaporated.

Toluene (100 mL) was added to dissolve the residue, then sodium hydroxide solution (75 mL) was added. The mixture was stirred vigorously at 80° C. until the toluene layer was colorless (2–3 hours). The solution was cooled and the toluene layer was recovered using a separatory funnel, washed with water (3×100mL), and dried with magnesium sulfate. Magnesium sulfate was removed by filtration. Toluene solvent was removed by rotary evaporation under vacuum at 80°–90° C., leaving a colorless, viscous, cloudy material (7.5 grams). An IR spectrum of the neat product showed a strong carbonyl stretch band at 1750 cm$^{-1}$, a strong band at 965 cm$^{-1}$ (trans internal—C=C—), a medium-intensity band at 725 cm$^{-1}$ (cis internal —C=C—), and a very weak band at 910 cm$^{-1}$ characteristic of vinyl (terminal) C=C bonds.

NMR Analysis: A quantitive C-13 NMR analysis was performed of the viscous product dissolved in chloroform-d with chromium acetylacetonate added as a relaxation agent. The spectrum was similar to that of 1,4-polybutadiene with the addition of weak resonances associated with acetoxy endgroups. Strong resonances were observed in the 128–131 ppm range assigned as internal olefinic carbons; strong singlet reasonances were observed at 32.6 ppm and 27.3 ppm in an approximate ratio of 4:1, assigned to methylene carbons adjacent to trans and cis internal C=C double bonds, respectively. The relative integration of the internal olefinic carbons and the methylene carbons (32.6 ppm+27.3 ppm resonances) was about 1:1, as expected for 1,4-polybutadiene.

Weak singlet resonances of approximately equal intensity were observed at 170.9 ppm (carbonyl carbon of acetoxy), 64.0 ppm (methylene carbon adjacent to —OAc group), and 20.9 ppm (methyl carbon of OAc). The integration of each of these resonances was about 2.2% of that of the internal olefinic carbons (128–131 ppm). Also, very weak singlet resonances were observed at 114.5 ppm and 138.3 ppm, assigned as terminal (vinyl) olefinic carbons, each with integration about 0.4% that of the internal olefinic carbons (128–131 ppm). No resonances were detected between 0 and 20.8 ppm, indicating a lack of any other methyl carbons besides the OAc methyl.

The functionality number (Fn) of the viscous product was calculated from the NMR data assuming 2 endgroups per molecule (linear, unbranched chains). The NMR indicated that the two major types of molecule endgroups were acetoxy (-OAc) and vinyl. The fraction of endgroups which are acetoxy was 80–85%, as calculated using relative integrations of endgroup resonances. This leads to Fn=1.6–1.7, where Fn is the average number of acetoxy endgroups per molecule.

In summary, the reaction produced 1,4-polybutadiene with an average acetoxy endgroup functionality of 1.6–1.7 (ideal difunctionality=2.0), as calculated using C-13 NMR data and the assumption of perfect chain linearity.

That which is claimed is:

1. A polymerization process for preparation of telechelic difunctional unsaturated oligomers and polymers, having at least one carbon-to-carbon double bond, containing functional groups which predominantly comprise terminal functional reactive groups, said oligomers and polymers having a functionality of about 2, wherein said polymerization process is substantially free of side reactions comprising double bond migration and cyclization, from polyenes of from 3 to 30 carbon atoms, and olefins of up to about 30 carbon atoms containing at least one functional group wherein said functional group is selected from the group consisting of a nitrile, ester, alcohol, diol, amine, acid, acyl halide, ketone, aidehyde, borane, amide, acid anhydride, ether, imide, halogen atom, alkyne, alkyl, aryl, and substituted aryl groups of up to 30 carbon atoms, wherein said polyene and said olefin are reacted in a cross-metathesis reaction in the presence of a catalyst system comprising a metathesis catalyst (A) comprising a transition metal compound selected from the group consisting of halides, oxyhalides, oxides and organic ammonium salts of tungsten, molybdenum, rhenium and tantalum; an activator and co-catalyst (B) selected from the group consisting of organic tin compounds, alkylaluminum halides, alkoxyalkylaluminum halides and aryloxyalkylaluminum halides; and an organic Lewis base (C) selected from the group consisting of organic esters, ethers, nitriles, amines, amides, and alkynes of from 2 to 30 carbon atoms, and organic phosphorus compounds, monohydric and dihydric alcohols of from 1 to 30 carbon atoms, wherein said metathesis catalyst (A) is present in an amount of from about 0.01 to about 50 millimoles per mole of said polyene, activator (B) is present in a molar ratio to metathesis catalyst (A) of from about 0.1:1 to about 200:1 and Lewis base (C)is present in a molar ratio to metathesis catalyst (A) of from about 0.1:1 to about 200:1.

2. The process of claim 1 wherein said organic Lewis base (C)is selected from the group consisting of alkyl acetates of from 3 to 30 carbon atoms, acetonitrile, acetylacetone, tetrahydrofuran, pyridine, N,N'-dimethylformamide, thiophene, diphenylether, ethyl ether, propyl ethers triethylamine, and phenylacetylene.

3. The process of claim 1 wherein said metathesis catalyst (A) is tungsten hexachloride, activator (B) is tetramethyltin, and Lewis base (C) is propyl acetate.

4. The process of claim 1 wherein said metathesis catalyst (A) is present in a ratio of from about 0.1 to 10 millimoles per mole of polyene and said activator (B) and said Lewis base (C) are each present in a ratio to said metathesis catalyst (A) of from about 1:1 to about 10:1.

5. The process of claim 1 wherein said polyene is selected from the group consisting of 1,5-hexadiene, 1,9-decadiene, 1,5,9-decatriene, divinylbenzene and mixtures thereof.

6. The process of claim 1 wherein said functionalized olefin contains at least one functional group selected from a nitrile, ester, alcohol, diol, amine, acid, acyl halide, ketone, aidehyde, borane, acid anhydride, ether, imide, alkyne, halogen atom, alkyl, aryl, and a substituted aryl group.

7. The process of claim 1 wherein said polymerization is at a temperature within the range of from about 0° C. to about 200° C. and pressure is within the range of from about $1 \times 10^{-6}$ mm Hg to about 30 atmospheres.

8. The process of claim 1 wherein said olefin metathesis reaction is driven to high conversion by removal of low molecular weight co-product olefins produced by said olefin metathesis reaction of said polyenes from said olefin metathesis reaction.

9. The process of claim 8 wherein said low molecular weight coproduct olefins are removed from said process by purging the olefin metathesis reaction with an inert gas during said reaction.

10. The process of claim 8 wherein said low molecular weight coproduct olefins are removed from said process by application of a vacuum in the range of from about 1 mm Hg to about 400 mm Hg during said reaction.

11. The process of claim 8 wherein said low molecular weight coproduct olefins are removed from said process by application of a vacuum to from about 1 mm Hg to about $10^{-6}$ mm Hg during said reaction.

12. The process of claim 8 wherein said low molecular weight coproduct olefins are removed from said process by a combination of steps comprising a purge of the olefin metathesis reaction with an inert gas, application of a low vacuum in the range of from about 1 mm Hg to about 400 mm Hg during said reaction, and an application of a high vacuum to about $1 \times 10^{-6}$ mm Hg, said steps being in any sequence and capable of being omitted individually.

13. The process of claim 1 wherein yield is at least 60% of theoretical based on polyenes.

14. The process of claim 1 wherein molar ratio of said polyene and said functional olefin is in the range of from about 1:1 to about 10,000:1.

15. The process of claim 1 wherein said telechelic difunctional unsaturated oligomers and polymers containing functional groups predominantly comprise terminal functional reactive groups wherein the functionality approaches 2.0 and the other identifiable end-groups present comprise terminal carbon-to-carbon double bonds of vinyl structure.

* * * * *

UNITED STATES PATENT AND TRADEMARK OFFICE
CERTIFICATE OF CORRECTION

PATENT NO.: 5,403,904

DATED: April 4, 1995

INVENTOR(S): Philip O. Nubel, Robert B. Morland, Howard B. Yokelson

It is certified that error appears in the above-identified patent and that said Letters Patent is hereby corrected as shown below:

| Col. | Line | | | |
|------|------|---|---|---|
| 1  | 15 | "aidehyde," | should read | --aldehyde,-- |
| 3  | 6  | "alkylidene moleties" | should read | --alkylidene moieties-- |
| 7  | 55 | "aidehyde," | should read | --aldehyde,-- |
| 9  | 68 | "$1 \times 10^{-6}$ Hg." | should read | --$1 \times 10^{-6}$ mm Hg.-- |
| 10 | 15 | "aidehyde," | should read | --aldehyde,-- |
| 12 | 29 | "aidehyde," | should read | --aldehyde,-- |
| 13 | 9  | "aidehyde," | should read | --aldehyde,-- |

Signed and Sealed this

Twelfth Day of September, 1995

Attest:

BRUCE LEHMAN

Attesting Officer     Commissioner of Patents and Trademarks